United States Patent
Kim (10) Patent No.: US 10,356,596 B2
(45) Date of Patent: Jul. 16, 2019

(54) DATA TRANSMISSION SYSTEM USING VEHICLE AND METHOD OF CONTROLLING SAME

(71) Applicants: Hyundai Motor Company, Seoul (KR); Kia Motors Corporation, Seoul (KR)

(72) Inventor: Joon Young Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 7 days.

(21) Appl. No.: 15/809,250

(22) Filed: Nov. 10, 2017

(65) Prior Publication Data

US 2018/0184278 A1    Jun. 28, 2018

(30) Foreign Application Priority Data

Dec. 28, 2016    (KR) .................. 10-2016-0181202

(51) Int. Cl.
| | |
|---|---|
| *H04W 8/00* | (2009.01) |
| *H04W 48/10* | (2009.01) |
| *H04W 84/18* | (2009.01) |
| *H04W 84/00* | (2009.01) |
| *H04W 88/04* | (2009.01) |

(52) U.S. Cl.
CPC .......... *H04W 8/005* (2013.01); *H04W 48/10* (2013.01); *H04W 84/005* (2013.01); *H04W 84/18* (2013.01); *H04W 88/04* (2013.01)

(58) Field of Classification Search
CPC ..... H04W 8/005; H04W 48/10; H04W 88/04; H04W 84/005; H04W 84/18
See application file for complete search history.

(56) References Cited

U.S. PATENT DOCUMENTS

| | | | |
|---|---|---|---|
| 2012/0140635 A1* | 6/2012 | Aoki | H04L 45/12 370/238 |
| 2013/0111577 A1* | 5/2013 | Ishidoshiro | H04L 61/2507 726/11 |

\* cited by examiner

*Primary Examiner* — Afshawn M Towfighi
(74) *Attorney, Agent, or Firm* — Morgan, Lewis & Bockius LLP (57) ABSTRACT

A method of transmitting data from one point to another point using a vehicle, and a system for performing the same may include searching for at least one neighbor vehicle, determining a vehicle which is to transmit the data to the second station, among the searched at least one neighbor vehicle, and transmitting the data to the determined vehicle.

15 Claims, 5 Drawing Sheets

| Current Station ID | Source Station ID | Destination Station ID | Types of Data | Data Size & Presence Time | Data Packet1 | Data Packet2 |

FIG. 5

DATA TRANSMISSION SYSTEM USING VEHICLE AND METHOD OF CONTROLLING SAME

The present application claims priority to Korean Patent Application No. 10-2016-0181202, filed on Dec. 28, 2016, the entire contents of which is incorporated herein for all purposes by this reference.

BACKGROUND OF THE INVENTION

Field of the Invention

The present invention relates to a method of transmitting data from one point to another point using a vehicle, and a system for performing the same.

Discussion of the Related Art

Recently, as development of electronic equipment combined with a vehicle has been accelerated, communication capabilities of vehicles have been remarkably improved. As such, vehicle-to-everything (V2X) technology indicating exchange of information via a wired or wireless network between a vehicle and other objects is attracting attention.

V2X technology may be categorized into vehicle-to-vehicle (V2V), representing communication between vehicles, vehicle-to-infrastructure (V2I), representing communication between vehicles and infrastructure, and vehicle-to-pedestrian (V2P)/vehicle-to-network (V2N), representing communication between vehicles and pedestrians or networks.

Thereamong, V2I technology has developed towards a scheme in which infrastructure mainly provides a vehicle with information which is necessary for driving or helpful to a driver (e.g., a traffic situation of a related region or a forward area or regional information), when the vehicle travels around infrastructure having a fixed location. However, in updating information or firmware to be provided to a vehicle, such infrastructure, e.g., infrastructure in the form of a station or a beacon, is disadvantageous in that coverage is limited when information should be received via a wireless network from other infrastructure providing related information and that a communication cable should be necessarily connected when information should be received via a wired network from other infrastructure. This may be problematic when a distance between infrastructures is long in a region having not much traffic or when self-powered infrastructure is needed in a region in which it is difficult to install a cable.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a data transmission system using a vehicle and a method of controlling the same that substantially obviate one or more problems due to limitations and disadvantages of the related art.

Various aspects of the present invention are directed to providing a method using a vehicle as a data transmission subject in performing data exchange between infrastructures, and a system for performing the same.

The technical objects that can be achieved through the present invention are not limited to what has been particularly described hereinabove and other technical objects not described herein will be more clearly understood by persons skilled in the art from the following detailed description.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance for the invention, as embodied and broadly described herein, a data transmission method for transmitting data by a first station to a second station includes searching for at least one neighbor vehicle, determining a vehicle which is to transmit the data to the second station, among the searched at least one neighbor vehicle; and transmitting the data to the determined vehicle.

In another aspect of the present invention, a station for transmitting a data to a destination station includes a processor, and a radio frequency (RF) module configured to externally transmit and receive a radio signal under control of the processor, wherein the processor performs a control operation to search for at least one neighbor vehicle, determine a vehicle which is to transmit the data to the destination station, among the searched at least one neighbor vehicle, and transmit the data to the determined vehicle.

It is to be understood that both the foregoing general description and the following detailed description of the present invention are exemplary and explanatory and are intended to provide further explanation of the invention as claimed.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Throughout the specification, when a part is referred to as "including" an element, it means that the part may include other elements as well, unless specifically stated otherwise. In addition, parts denoted by the same reference numerals throughout the specification denote the same components.

In the following description, "goal station", "target station", and "destination station" are used interchangeably to indicate an infrastructure object through which all data is to be finally received.

According to an exemplary embodiment of the present invention, when one infrastructure object cannot communicate with a target infrastructure object to which data is to be transmitted, it is provided that data be wirelessly transmitted to a vehicle which travels toward the target infrastructure and the vehicle wirelessly transmit the data back to the target infrastructure after the vehicle travels to the target infrastructure.

Infrastructure according to the present embodiment includes stations, beacons, or other similar types configured for performing V2I communication and may be any infrastructure when such infrastructure can perform wireless communication via a predetermined V2I protocol with a (traveling) vehicle located in coverage thereof. Notably, infrastructure described below is referred to as a "station" for convenience.

In addition, it is assumed that a vehicle described below can perform V2I communication with an adjacent station during traveling and includes a memory configured for temporally storing data transmitted by the station.

First, a data transmission process using a vehicle according to an exemplary embodiment of the present invention will now be described with reference to FIG. 1.

Figure 1:
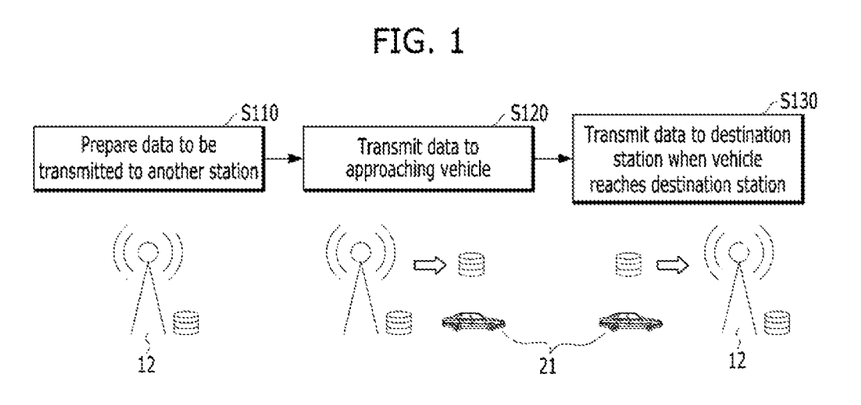
FIG. 1 illustrates an exemplary process in which a station transmits data to another station, using a vehicle, according to an exemplary embodiment of the present invention.

FIG. 1 illustrates an exemplary process in which a station transmits data to another station, using a vehicle, according to an exemplary embodiment of the present invention.

Referring to FIG. 1, a station 11 prepares data which is to be transmitted to a destination (target) station 12 (S110). When the data is prepared, the station 11 transmits the data, which is to be transmitted to the destination station 12, to an approaching vehicle 21 while the vehicle 21 stays in coverage thereof (S120). The vehicle 21 may travel towards the destination station 12, with the data received from the station 11 being stored therein, and transmit the stored data to the destination station 12 while staying in coverage of the destination station 12 (S130).

Figure 2:
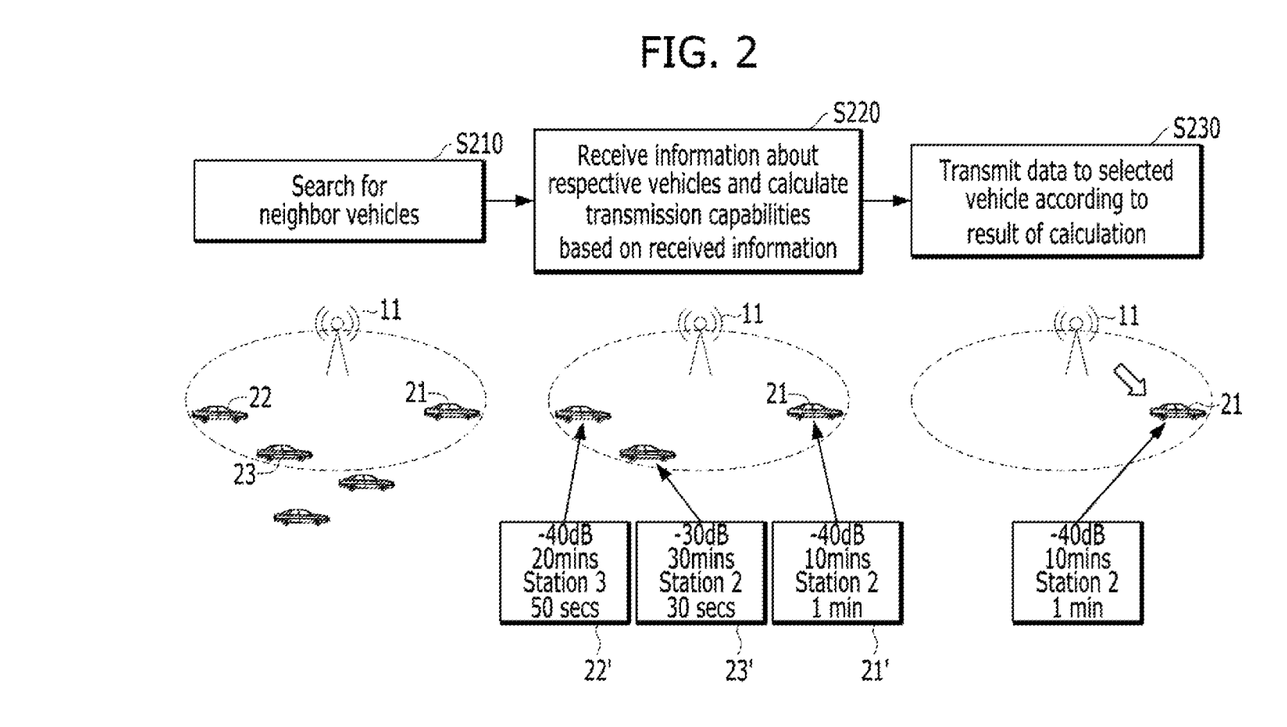
FIG. 2 illustrates an exemplary process in which a station selects a vehicle which is to transmit data according to an exemplary embodiment of the present invention.

FIG. 2 illustrates an exemplary process in which a station selects a vehicle which is to transmit data according to an exemplary embodiment of the present invention.

Referring to FIG. 2, to determine a vehicle which is to transmit data, the station 11 searches for neighbor vehicles (S210). For example, the station 11 may broadcast a predetermined message and wait for a response to the message. The broadcast message may include identification (ID) information related to the station, information indicating a request for data transmission, information related to amount of the requested data, and information related to radio resources for receiving a response message.

Upon receiving the broadcast message in coverage of the station 11, vehicles 21, 22, and 23 may transmit response messages to the broadcast message. Each response message may include communication sensitivity measured through the broadcast message, destination information, average velocity information, and information related to data transmission acceptance/non-acceptance. The station 11 may determine transmission capabilities of each vehicle based on the information included in the response message (S220).

A result of determination may be obtained by assigning different priorities to communication sensitivity, information related to stopover/non-stopover in a destination station (in the instant case, the destination station is assumed to be station 2) determined through the destination information, an expected travel time to the destination station, and a staying time in coverage of the station determined through the average velocity information. As illustrated in the lower center of FIG. 2, the station 11 may determine respective transmission capabilities 21', 22', and 23' of the vehicles 21, 22, and 23 that have transmitted the response messages and compare the transmission capabilities with priorities. Herein, each of the transmission capabilities 21', 22', and 23' sequentially indicates a communication sensitivity, expected travel time, a station in which each vehicle stops over, and a staying time, from top to bottom For example, when the priorities are assigned in order of "stopover/non-stopover>staying time>communication sensitivity>expected travel time", the station 11 first determines whether a vehicle stops over in station 2 corresponding to the destination station and excludes a vehicle, e.g., the second vehicle 22, that does not pass through station 2 from candidates for data transmission. Next, the station compares the staying time which is the next priority and may finally select the first vehicle 21 that stays for one minute.

In the instant case, the station may additionally consider a minimum transmission time consumed until the data is completely transmitted to a vehicle, using the amount of data and data transmission rate. That is, even when a vehicle has the longest time staying in coverage, when it is expected that the vehicle stays in coverage for a shorter time than the minimum transmission time, the station may not perform data transmission to the vehicle.

After selecting a vehicle which is to transmit data, the station 11 may transmit data to the selected vehicle 21 (S230).

Meanwhile, according to the present embodiment, data may be distributively transmitted through a plurality of vehicles.

Figure 3:
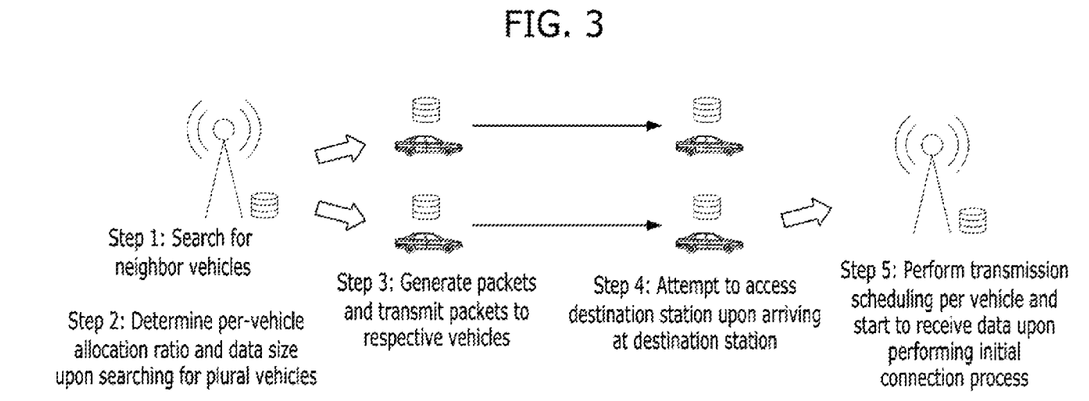
FIG. 3 illustrates an exemplary process in which a station transmits data using a plurality of vehicles according to an exemplary embodiment of the present invention.

FIG. 3 illustrates an exemplary process in which a station transmits data using a plurality of vehicles according to an exemplary embodiment of the present invention.

Referring to FIG. 3, the station 11 searches for neighbor vehicles (Step 1).

As a result of search, when a plurality of vehicles 21 and 22 is searched for, the station 11 determines transmission capabilities as described with reference to FIG. 2 and determines a per-vehicle data allocation ratio and a data size based on the data allocation ratio, using the transmission capabilities (Step 2).

The station 11 generates packets by dividing the data, based on the determined per-vehicle data allocation ratio and data size, and transmits the packets to the respective vehicles 21 and 22 (Step 3).

Upon arriving at the destination station 12, the vehicles 21 and 22 may attempt to access the destination station (Step 4).

When a data path is established between the destination station 12 and the vehicles 21 and 22 through an initial connection process according a predetermined ping procedure, the destination station 12 may perform transmission scheduling per vehicle to receive the data, receive the data (i.e., divided packets), and restore the divided packets to original data (Step 5).

Figure 4:
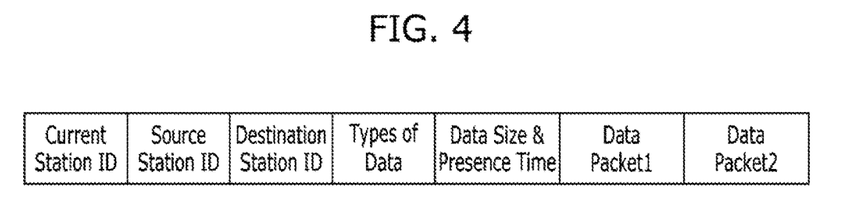
FIG. 4 illustrates an exemplary data packet structure for transmitting data according to an exemplary embodiment of the present invention.

FIG. 4 illustrates an exemplary data packet structure for transmitting data according to an exemplary embodiment of the present invention.

Referring to FIG. 4, a data packet delivered by a vehicle may be divided into a header and a payload.

The header may include a Current Station ID field, a Source Station ID field, a Destination Station ID field, a Car ID field, a Type of Data field, and a Data Size & Required Presence Time field.

The payload may include one or more sub-data packets Data Packet 1, Data Packet 2, Data Packet N.

Hereinafter, each field will be described in more detail.

Current Station ID: This field indicates an ID of a station that has transmitted a corresponding data packet to a vehicle.

Source Station ID: This field indicates a station that has generated original data included in a sub-data packet. This field may be omitted when a current station and a source station are identical.

Destination Station ID: This field indicates an ID of a destination station to which the data packet should be transmitted.

Car ID: This field indicates an ID of a vehicle carrying the data packet.

Type of Data: This field indicates a type corresponding to the original data included in a payload of the data packet among a plurality of predetermined data types. When the type indicates the degree of urgency of data transmission, it is desirable that this field indicate a non-urgent type since data transmission is a vehicle transmission scheme. Data of this non-urgent type may include operation policy data of a station, software update data, and terms and conditions/government regulation data.

Data Size & Required Presence Time: This field indicates the size of the data packet, and a required time during which a vehicle should stay in coverage of the station for complete data transmission between the vehicle and the station. The required presence time may be determined as follows: "required presence time=data size/((maximum transmission rate+minimum transmission rate)/2)".

For example, assuming that the data size is 10 GB, the maximum transmission rate is 1 Gbps, and the minimum transmission rate is 10 Mbps, the required presence time is (10 GB*8 bits/byte)/((1 Gbps+10 Mbps)/2), i.e., about 160 seconds.

Hereinafter, a vehicle and a station through which the above-described embodiments of the present invention can be performed will be described.

The vehicle may serve as a transmitter on uplink and as a receiver on downlink, whereas the station may serve as a receiver on uplink and as a transmitter on downlink. Thus, the vehicle and station each may include a transmitter and a receiver for information or data transmission.

The transmitter and the receiver each may include a processor, a module, a part, and/or means to perform the exemplary embodiments of the present invention. The transmitter and the receiver each may include a module (or means) for encrypting a message, a module for decrypting the encrypted message, and an antenna for transmitting and receiving a radio signal. An exemplary embodiment of the transmitter and the receiver will be described with reference to FIG. 5.

Figure 5:
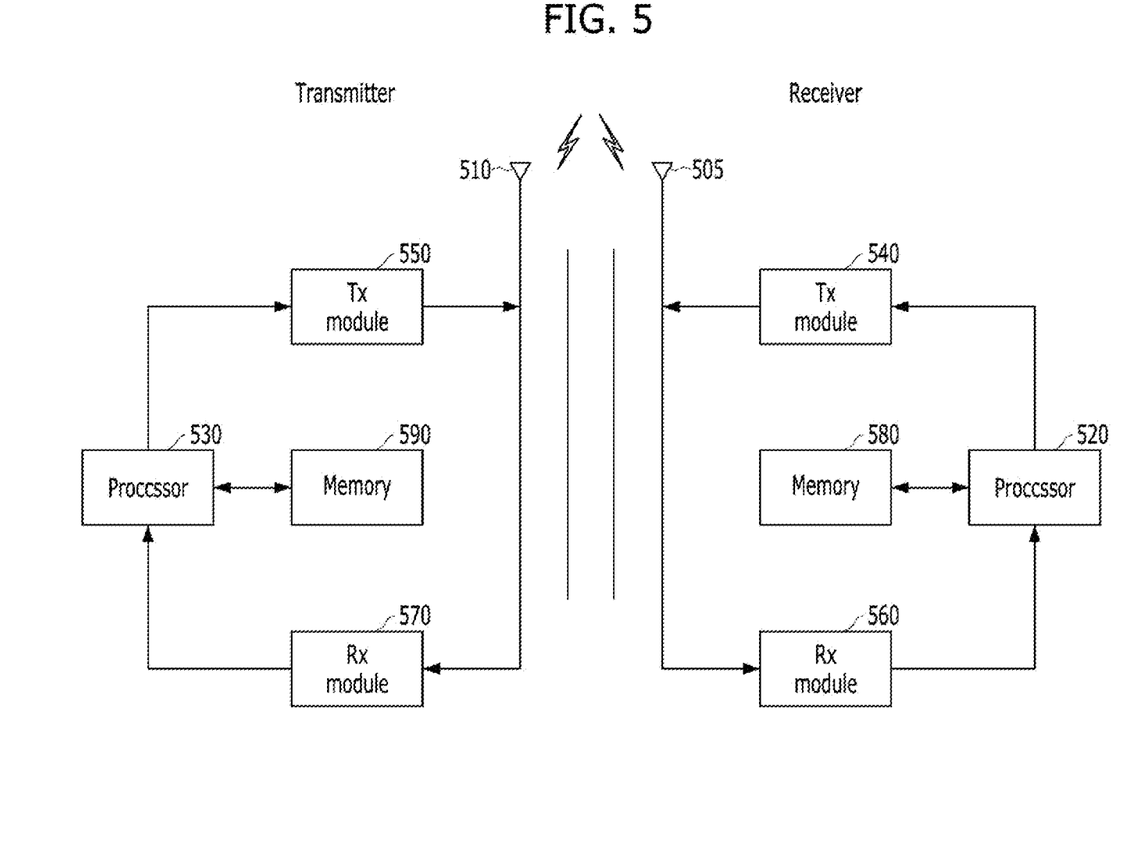
FIG. 5 is a block diagram illustrating the structure of a transmitter and a receiver applicable to embodiments of the present invention.

FIG. 5 is a block diagram illustrating the structure of a transmitter and a receiver applicable to embodiments of the present invention.

Referring to FIG. 5, the transmitter and the receiver are shown on the left and right sides, respectively. The transmitter and the receiver may include antennae 510 and 505, processors 530 and 520, transmission (Tx) modules 550 and 540, reception (Rx) modules 570 and 560, and memories 590 and 580, respectively. The components of the transmitter are counterparts of the components of the receiver. Hereinafter, each component will be described in more detail.

The antennae 505 and 510 transmit signals generated from the Tx modules 540 and 550 to the external or receive radio signals transmitted from the external to transfer the received radio signals to the Rx modules 560 and 570. When multiple input multiple output (MIMO) is supported, two or more antennae may be used.

An antenna, a Tx module, and an Rx module may collectively form a radio frequency (RF) module.

The processors 520 and 530 control overall operations of the receiver and the transmitter. For example, the processors 520 and 530 may perform a control function for performing the exemplary embodiments of the present invention, a variable media access control (MAC) frame control function based on service characteristics and a propagation environment, a handover function, and an authentication and encryption function.

The processor of the station may determine transmission capabilities of related vehicles through information received from neighbor vehicles to select a vehicle suitable for data transmission and perform scheduling so that, upon receiving data from a vehicle, the vehicle may transmit the data. In addition, the processor of the station may determine whether to divide the data, generate divided packets, and restore the divided packets.

In addition, the processor of the station may perform overall control of the operation process described in the above embodiments.

In addition, the processor of the vehicle may generate message content to be transmitted to the station in response to information related to a broadcast message obtained from the station and perform overall control to perform a process of receiving data from the station and a process of transmitting data to a destination station.

The Tx modules 540 and 550 may be scheduled by the processors 520 and 530 to perform predetermined coding and modulation on data to be externally transmitted and transmit the coded and modulated data to the antenna 510.

The Rx modules 560 and 570 may perform decoding and demodulation on a radio signal received externally from the antennae 505 and 510 to restore the decoded and demodulated signal to original data and transmit the restored data to the processors 520 and 530.

The memories 580 and 590 may store programs for processing and controlling the processors 520 and 530 and store input/output data, data packets transmitted by the station. Each of the memories 580 and 590 may include at least one storage medium among a flash type memory, a hard disk type memory, a multimedia card micro type memory, a card type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

Meanwhile, the station may perform, through at least one of the above modules, a control function, orthogonal frequency division multiple access (OFDMA) packet scheduling, time division duplex (TDD) packet scheduling and channel multiplexing functions, a high-speed traffic real-time control function, a handover function, an authentication and encryption function, a packet modulation/demodulation function for data transmission, a high-speed packet channel coding function, a real-time modem control function, etc. to implement the above-described embodiments of the present invention or may further include an additional device, module, or part for performing these functions.

The present invention may be implemented as computer-readable code that can be written on a computer-readable medium in which a program is recorded. The computer-readable medium may be any type of recording device in which data that can be read by a computer system is stored. Exemplary embodiments of the computer-readable medium include a hard disk drive (HDD), a solid state drive (SSD), a silicon disk drive (SDD), a ROM, a RAM, a CD-ROM, a magnetic tape, a floppy disk, and an optical data storage.

According to at least one exemplary embodiment of the present invention constructed as described above, one infrastructure can transmit data to another infrastructure using a vehicle only through near-field communication.

Information related to vehicles approaching an infrastructure is acquired and criteria for selecting one or more vehicles suitable for information delivery are defined, so that data can be distributively transmitted using a plurality of vehicles.

Therefore, a situation in which direct communication between infrastructures is physically impossible can be solved without additional resources.

The effects that can be achieved through the present invention are not limited to what has been particularly described hereinabove and other effects not described herein will be more clearly understood by persons skilled in the art from the above description.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A data transmission method for transmitting data by a first station to a second station, comprising:
    searching for at least one neighbor vehicle, the searching including broadcasting a first message;
    receiving a second message, from each of the at least one neighbor vehicle in a response to the first message;
    determining a vehicle which is to transmit the data to the second station, among the searched at least one neighbor vehicle; and
    transmitting the data to the determined vehicle,
    wherein the determining a vehicle which is to transmit the data to the second station includes determining, using information included in the second message, at least one of information related to stopover/non-stopover in the second station determined by a destination information and an expected travel time to the second station.

2. The data transmission method according to claim 1, wherein the first message includes at least one of identification information related to the first station, information indicating a request for data transmission, information related to amount of the data, and information related to radio resources configured for receiving a response message.

3. The data transmission method according to claim 1, wherein the second message includes at least one of communication sensitivity, destination information, average velocity information, and information related to data transmission acceptance/non-acceptance.

4. The data transmission method according to claim 3, wherein the determining a vehicle which is to transmit the data to the second station further includes determining transmission capabilities of each of the at least one neighbor vehicle based on information included in the second message.

5. The data transmission method according to claim 4, wherein the determining a vehicle which is to transmit the data to the second station further includes determining, using the information included in the second message, at least one of the communication sensitivity, and a staying time in coverage of the first station, determined through the average velocity information.

6. The data transmission method according to claim 5, wherein the determining a vehicle which is to transmit the data to the second station further includes assigning different priorities to the communication sensitivity, the information related to the stopover/non-stopover, the expected travel time, and the staying time.

7. The data transmission method according to claim 1, further including dividing the data into data packets for respective vehicles, when a plurality of vehicles is determined to transmit the data.

8. A non-transitory computer-readable recording medium in which a program for executing the data transmission method is recorded according to claim 1.

9. A station for transmitting a data to a destination station, comprising:
    a processor; and
    a radio frequency (RF) module configured to externally transmit and receive a radio signal under control of the processor,
    wherein the processor is configured to perform a control operation to search for at least one neighbor vehicle by broadcasting a first message, receive a second message from each of the at least one neighbor vehicle in a response to the first message, determine a vehicle which is to transmit the data to the destination station, among the searched at least one neighbor vehicle, and transmit the data to the determined vehicle, and wherein the processor is further configured to determine transmission capabilities by determining, using information included in the second message, at least one of information related to stopover/non-stopover in a target station and an expected travel time to the target station.

10. The station according to claim 9, wherein the first message includes at least one of identification information related to the station, information indicating a request for data transmission, information related to amount of the data, and information related to radio resources configured for receiving a response message.

11. The station according to claim 9, wherein the second message includes at least one of communication sensitivity, destination information, average velocity information, and information related to data transmission acceptance/non-acceptance.

12. The station according to claim 11, wherein the processor is configured to determine the transmission capabilities of each of the at least one neighbor vehicle based on information included in the second message.

13. The station according to claim 12, wherein the processor is configured to determine the transmission capabilities by determining, using the information included in the second message, at least one of the communication sensitivity, and a staying time in coverage of the station, determined through the average velocity information.

14. The station according to claim 13, wherein the processor is configured to determine a vehicle which is to transmit the data to the target station by assigning different priorities to the communication sensitivity, the information related to the stopover/non-stopover, the expected travel time, and the staying time.

15. The station according to claim 9, wherein the processor divides the data into data packets for respective vehicles, when a plurality of vehicles is determined to transmit the data.

* * * * *